United States Patent [19]

Wünning

[11] 4,373,903

[45] Feb. 15, 1983

[54] BURNER SYSTEM

[75] Inventor: Joachim Wünning, Leonberg, Fed. Rep. of Germany

[73] Assignee: Aichelin GmbH, Korntal-Münchingen, Fed. Rep. of Germany

[21] Appl. No.: 209,591

[22] Filed: Nov. 24, 1980

[30] Foreign Application Priority Data

Nov. 29, 1979 [DE] Fed. Rep. of Germany ....... 2948048

[51] Int. Cl.³ .................. F23D 11/44; F27B 5/14; B05B 1/24
[52] U.S. Cl. .................................. 431/215; 431/160; 239/129; 432/209
[58] Field of Search ............. 431/215, 116, 160, 188, 431/353; 432/173, 209; 239/129, 139; 137/335

[56] References Cited

U.S. PATENT DOCUMENTS

| 3,285,240 | 11/1966 | Schmidt | 431/215 |
| 4,060,379 | 11/1977 | LaHaye et al. | 431/116 |
| 4,255,122 | 3/1981 | Alpkvist et al. | 431/215 |
| 4,298,333 | 11/1981 | Wunning | 431/215 |
| 4,306,858 | 12/1981 | Simon | 431/215 |

FOREIGN PATENT DOCUMENTS

| 2742070 | 3/1979 | Fed. Rep. of Germany | 431/215 |
| 3017618 | 11/1981 | Fed. Rep. of Germany | 239/129 |
| 771483 | 7/1934 | France | 431/160 |
| 2028490 | 3/1980 | United Kingdom | 431/215 |

Primary Examiner—Samuel Scott
Assistant Examiner—G. Anderson
Attorney, Agent, or Firm—Frishauf, Holtz, Goodman & Woodward

[57] ABSTRACT

In order to permit operation with preheating of the combustion-supporting air to 50 or preferably 65 percent or more of the oven temperature, the air is fed to a ceramic burner tube through an annular nozzle directing it in an annular jet along the interior walls of the burner tube. For a burner of low back pressure having no restriction at the mouth of the ceramic burner tube, the ceramic burner tube fits over the end of the outer member of the annular nozzle and some of the combustion product gas, flowing from the oven into the burner structure for countercurrent of the preheating of the air supply, is sucked into the underpressure zone between the annular air jet and the inner wall of the burner tube through a small annular gap where the burner tube fits on the air-supply nozzle. For a burner design involving considerable back pressure, the ceramic burner tube fits within the outer wall of the annular nozzle with a very small clearance in the overlap and some of the supplied air, which is at higher pressure than the exit in gases, escapes through the gap around the outside of the burner tube and cools the burner tube and the adjacent overlapping portion of the air supply tube.

12 Claims, 2 Drawing Figures

BURNER SYSTEM

This invention concerns a burner system for the heating of oven spaces and reactors such are used in industry, having heat-recuperative preheating of the air used to burn gaseous or liquid fuel. Such burner systems utilize an air supply tube discharging into a coaxial ceramic burner tube in which a flame is formed. The air-supply tube forms one part of a heat recuperator on one side of which the exhaust combustion gases flow, and on the other side of which the air supply flows in countercurrent with the combustion gases. The air-supply tube also surrounds a fuel supply tube of smaller diameter leading to the region of the discharge of air into the ceramic burner tube and contains an air-guiding cylinder for and defining an annular space within the air-supply tube for the flow of the air supply.

Such an industrial burner system, as, for example, the one described in DE OS No. 24 42 070, typically serves for the heating of jet pipes and blast guns or for the direct heating of oven spaces and industrial ovens. A portion of the heat of the combustion gases is withdrawn by the builtin recuperator that is used for the preheating of the combustion-supporting air in order thereby to improve the efficiency of the burner system. With increased air preheating, however, substantial construction difficulties arise, particularly in the burner port region (i.e., in the mixing zone for fuel and air) and also in the combustion space itself.

Components in this region are so strongly stressed thermally with increasing air temperature, that ceramic materials for the burner tube can no longer be considered seriously as their connection and sealing with the metallic air supply tube forming a part of the recuperator poses problems.

The metallic air-supply tube has a coefficient of thermal expansion which is different from that of the ceramic burner tube which surrounds the actual combustion chamber. Since the ceramic burner tube is very sensitive to tension stress, there is a danger that it will break off in the region of its connection to the air-supply tube, so that the burner becomes unusable. It must be taken into account that with a design of the recuperator for combustion air preheating up to 50 percent, and preferably over 60 percent, of the oven-gas temperature, the burner port exhibits a temperature that reaches to about 80 to 90 percent of the oven temperature. That means that with a process temperature of 1200° C., the port region of the burner is subject to a temperature of over 1000° C.

At these temperatures even the metallic portions of the burner port are also brought into the overheating problem. In consequence, industrial burners with recuperative air preheating have up to now not been driven at such a high degree of combustion air preheating.

THE INVENTION

An object of the invention is to provide a burner system for industrial heating or the like, that operates with a relatively high preheating of the combustion air and thereby at a high degree of efficiency, without the occurrence of intolerable stress on the recuperator, the air supply tube, the burner tube, or other parts in the region of the burner port, which would impair the service life or the safety of operation of the burner.

In accordance with the invention, an annular nozzle is provided to provide an air jet directly alongside the interior wall of the burner tube. The nozzle is provided adjacent to the annular space of the air supply tube in the region of the burner port and from it the combustion air flows along the interior wall of the burner tube at increased velocity in the form of an annular air jet. Furthermore, the air supply tube is cooled at the burner port at the region of its end portion by gas of lower temperature than the flame gas temperature that passes between the air-supply tube and the burner tube. The burner system can be of such a configuration that the air jet exiting from the ring nozzle, in cooperation with the interior wall of the burner tube, defines an underpressure zone that is connected to a space on the exterior of the burner tube surrounding the latter that contains combustion product gases. The result is thereby obtained that combustion product gases that are relatively cool in comparison to the flame gases are sucked in between the air-supply tube and the burner tube at their place of connection, which effect provides protection to the burner tube and the air-supply tube in the region of the burner port against their subjection to intolerable temperature increases.

In a practical embodiment the underpressure zone can be connected to the space containing the combustion product gases by an annular slot formed between the burner tube interior wall and the air-supply tube extending into the burner tube by a predetermined amount. Since this makes unnecessary any particular seal between the burner tube and the recuperator, the burner tube can be loosely (that is, without sealing) put in place on the air-supply tube with the formation of this annular gap.

This type of practical embodiment is of interest particularly for cases of low back pressure in the combustion chamber surrounded by the burner tube, for example, in jet pipes or in the case of burners with only moderate exit velocity of the combustion gases (i.e., with open burner tube). As practical experience has shown, it is then desirable for the exit velocity of the air jet out of the annular nozzle to be at least 50 meters per second at the nominal power rating and for a combustion air temperature of at least 500° C.

Without the effect of combustion product gases sucked through the underpressure zone by the air jet, the result of the slightest counterpressure, by example, by uplift in the case of an installation of downwardly directed construction, is that extremely hot flame gases would penetrate through the ring gap or slit between the burner tube and the recuperator and would rapidly destroy the metallic burner port.

In the case of greater counterpressure in the burner chamber, for example, when the flame gases are to have imparted to them a high gas velocity by means of a nozzlelike narrowing, the ring-shaped air jet can under certain conditions fail to suck enough of the combustion gases and with further incrrease in counterpressure can no longer protect against the penetration of the hot flame gases into the ring gap between the burner tube and the recuperator.

For applications under such conditions, the burner system of the invention is then so constituted that the annular space is put in connection with space surrounding the outside of the combustion chamber through a ring gap between the burner tube and the air supply tube, while the pressure of the preheated combustion air in the annular space is kept higher than the pressure in the space surrounding the burner tube. There are particularly simple relations when the burner tube is simply inserted more or less loosely in the air-supply tube.

Because of the fact that the pressure of the combustion-supporting air coming through the annular space is greater than the pressure of the combustion gases on the outer side of the burner tube, comparatively cool combustion air flows at the burner port between the burner tube and the end region of the air-supply tube. The air leakage looses thus resulting merely need to be taken into account in determining or measuring out a quantity of combustion air supply. The possibility of overheating the metallic or ceramic parts of the construction is now effectively excluded. Since the connection between the recuperator and the burner tube lies on the outer wall or layer of the burner tube, in operation there results automatically an annular gap at this place through which the supplied air producing the cooling exits. In order to protect against erosion of the metallic components in the region of the annular jet under conditions of very high air preheating, it can be useful for the annular jet itself to be bounded by a ceramic tube to which the air-guiding cylinder is connected.

In all configurations of the industrial-burner system according to the invention, it is useful for the recuperator to provide preheating of the combustion air to at least 50 percent, and preferably to more than 60 percent, of the oven gas temperature. Since the air supply in the combustion chamber is produced by the ring nozzle, a relatively large free space remains in the burner system which can be utilized by providing an axial cool air channel bounded externally by the air-guiding cylinder and the annular nozzle provided with a connection to a source of cool air so that cool air can be blown into the oven space by a path that bypasses the recuperator. Furthermore, in the space between the annular jet and the fuel supply tube, ignition and flame-monitoring devices can be provided, for which a gap width of at least 12 mm is required. Finally, a rotary movement can also be imparted by suitable vanes for stabilizing the flow of combustion air through the annular nozzle.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
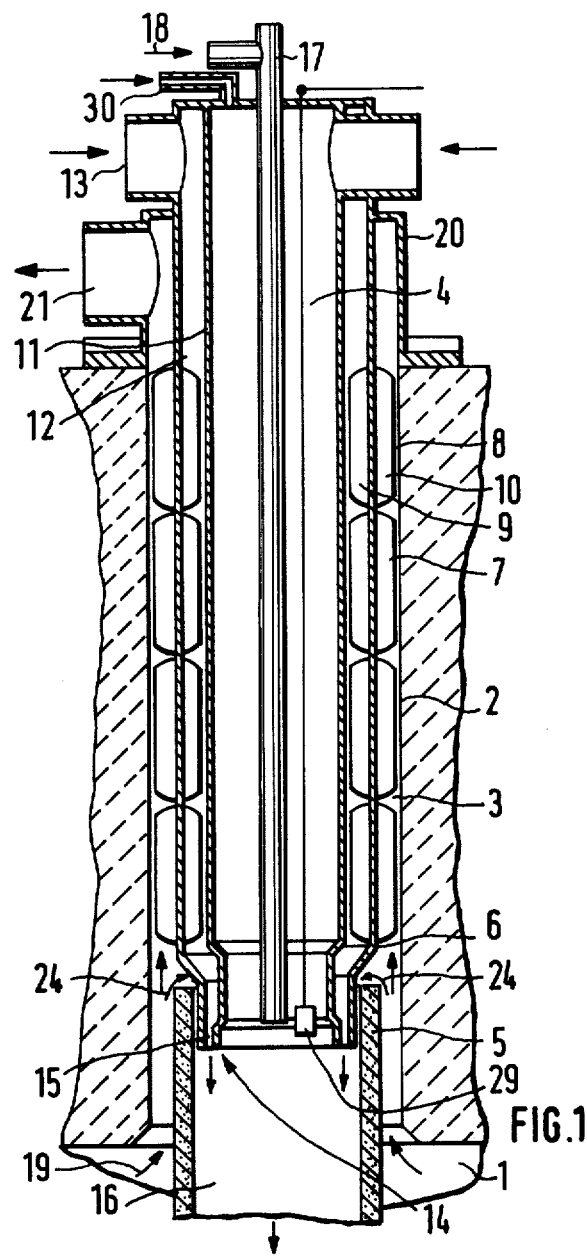
FIG. 1 is a side view, mostly an axial section and diagrammatically shown of a burner system according to the invention.

The burner system of the invention, illustrated in the figures of the drawings by two different embodiments, serves for the heating of an adjoining oven chamber, designated 1 in the drawing, which is part of an industrial oven having chamber walls 2 and a cylindrical passage 3 into which the burner 4 is installed.

The burner 4 has a cylindrical ceramic burner tube 5 into which a coaxial air-supply tube 6 discharges, the air-supply tube 6 forming a part of a recuperator 7. The recuperator 7 is constituted as a so-called ribbed recuperator. It has end-to-end connected tube segments 8 that carry inwardly projecting heat-exchanger ribs 9 and outwardly projecting heat-exchanger ribs 10. A coaxial air-guiding cylinder 11 is set within the air-supply tube 6, defining with the air-tube 6 an annular space 12 in which the heat-exchanger ribs 9 of the recuperator 7 lie.

The annular space 12 is supplied with combustion-supporting air through a supply pipe 13. In the region of the burner port 14, an annular nozzle 15 is connected to the annular space 12 which is shown in detail in FIG. 2 and out of which the combustion air supplied at 13 spurts out with increased velocity in the form of an annular jet along the interior wall of the burner tube 5 surrounding a combustion chamber 16.

In the interior of the air-guiding cylinder 11, a coaxial fuel-supply tube 17 of smaller diameter is disposed that is also known as a fuel lance and extends all the way through the burner port 14.

In operation, a liquid or gaseous fuel is supplied through the fuel-supply tube 17 as indicated by an arrow 18. The fuel so supplied is mixed, in the region of the burner port 14 and in the burner chamber 16, with the annular combustion air jet issuing out of the annular nozzle 15, and after ignition, it burns with the formation of a corresponding flame in the combustion chamber 16 which is surrounded by the burner tube 5 consisting of silicon carbide.

An open burner tube 5 is illustrated in FIG. 1. The combustion product gases issue out of the combustion chamber 16 into the oven chamber 1 and finally flow back as shown by arrows 19, through the ring gap between the burner tube 5 and the interior wall of the opening 3 of the oven chamber wall 2, into an exhaust gas gathering chamber 20, from which they are led away through an exhaust gas duct 21. On their way out of the oven chamber 1 into the exhaust gas gathering chamber 20, the combustion gases given up a part of their heat through the heat-exchanger ribs 10 and 9 of the recuperator 7 over to the supplied combustion air, so that the latter is correspondingly preheated.

The recuperator is designed by its dimensioning to preheat the combustion air to at least 50 percent, and preferably to 65 percent or more, of the temperature of the oven gases as defined by the temperature that is prevalent in the oven chamber 1. A substantial increase of the efficiency of the burner is thus obtained; on the other hand, the parts of the burner lying in the region of the burner port 14 are exposed to high temperature stresses. For a process temperature of about 1,200° C., the burner port region under such circumstances is at a temperature of about 1,000° C.

In order to protect against excessive erosion of the burner in the region of the burner port 14, particular precautions are taken which are explained as follows.

Figures 2, 3:
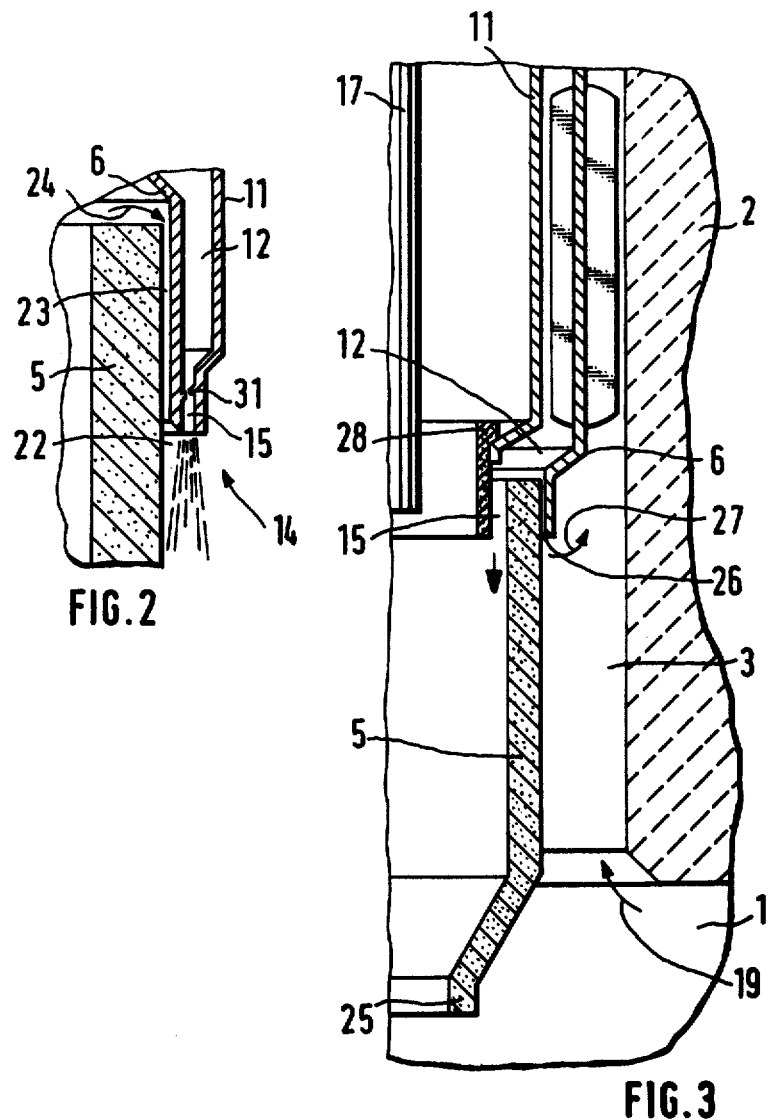
FIG. 2 is a magnified detail view of a portion of the annular nozzle, likewise an axial section.
FIG. 3 is a partial axial section of a second embodiment of a burner system according to the invention.

In the embodiment illustrated in FIGS. 1 and 2, the configuration is such that the ceramic burner tube 5 is loosely pushed onto a portion, of correspondingly reduced diameter, of the air-supply tube 6, in such a way that the latter extends to a predetermined extent into the burner tube 5. The annular combustion air stream issuing out of the annular nozzle 15 at a velocity of at least 50 m/sec, as measured under normal load, and a combustion-supporting air temperature of 500° C. at the burner port 14, extends as already mentioned along the interior wall surface of the burner tube 5. It defines or bounds thus an annular underpressure zone 22 in cooperation with the interior wall surface of the burner tube 5, which zone is connected with the annular space between the burner tube 5 and the interior wall of the opening 3 of the oven chamber wall structure 2, through which the combustion product gases passing from the oven chamber 1 stream. The connection passage is provided through the ring gap 23 present between the portion of the air-supply tube 6 projecting into the burner tube 5 and the interior wall surface of the latter.

Under the effect of the partial vacuum existing in the underpressure zone 22, combustion product gas is sucked through the ring gap 23 as indicated by the arrows 24. Since this combustion product gas is relatively cool compared to the flame gases, both the air supply tube 6 and the burner tube 5 are cooled in the region of the burner port 14, so that in spite of the intense preheating of the air, these parts are held in an operating temperature region that is permissible from the point of view of material wear and erosion.

The annular nozzle 15, as is clear from FIG. 2, has a smaller diameter than the interior wall surface of the burner tube 5. Its spacing from the interior wall surface of the burner tube 5 is to be determined to correspond to the conditions of the particular case.

The ring gap 23 between the air-supply tube 6 and the burner tube 5 can be quite simply provided by mounting the ceramic tube 5 by pushing it onto the air-supply tube 6 in the manner shown in FIG. 1 without further fastening, so that the mounting is in effect loose. In principle, the same effect is also obtainable by providing actual channels for passage of the combustion product gas, for example, parallel to the axis, in the region of the ring gap 23, for which purpose, for example, the interior wall surface of the burner tube 5 can be provided with corresponding grooves parallel to the axis of the air-supply tube 6, at its portion extending into the burner tube 5, can be correspondingly corrugated. Another possibility is the provision of openings leading radially outward in the region of the ring gap 23 through which the combustion-product gases can flow into the underpressure zone 22.

The above-described burner 4 illustrated in FIGS. 1 and 2 is designed for installation providing conditions in which only a small counterpressure is present in the combustion chamber 16. This applies, for example, to the use of the burner 4 in jet tube or for operation with only moderate exit velocities of the combustion gases (i.e., with open burner tube as illustrated in FIGS. 1 and 2).

If a burner of the type described operating under the above-mentioned high degree of combustion air preheating is to be provided where a relatively high counterpressure is to be expected in the burner chamber 16, for example, if the flame gases are to have a high velocity imparted to them by a nozzlelike narrowing 25 (FIG. 3) at the end of the flame tube 5, the described sucking in of combustion gases through the ring gap 23 and the underpressure zone 22 (FIG. 2) can no longer be effective. The burner then must have the configuration illustrated in FIG. 3.

In the burner illustrated merely in a radial section in FIG. 3, the parts conforming with the embodiment according to FIGS. 1 and 2 are designated with the same reference numerals. These parts do not need to be further explained in detail.

In contrast to the proportions shown in the embodiments according to FIGS. 1 and 2, the ceramic burner tube 5 of FIG. 3 is loosely inserted into the portion of the air-supply tube 6 of correspondingly reduced diameter 10 without it being necessary to provide a particular sealing between the burner tube 5 and air-supply tube 6. At the same time, the pressure of the combustion-supporting air prevailing in the annular space 12 is so selected that it lies higher than the combustion-gas pressure that prevails in the opening 3 in the region of the outer surface at the burner tube 5.

In operation, because of the different thermal expansion of the metallic air-supply tube 6 and the ceramic burner tube 5, a ring gap 26 is formed between the exterior surface of the burner tube 5 and the interior surface of the portion of the air-supply tube 6 that surrounds the burner tube 5. Because of the already-mentioned overpressure in the annular space 12, air that is relatively cool compared to the flame gases flows outward through this ring gap 26 and thereby cools both the burner tube 5 and this portion of the air-supply tube 6 that surrounds the burner tube 5, so that these parts cannot be subjected to impermissible operating temperatures.

The leakage losses resulting from air flowing through the ring gap 26 are taken into account in the design of the combustion-supporting air supply to the burner; the air issuing out is indicated in FIG. 3 by arrows 27.

The ring gap 26, moreover, can be replaced or supplemented by grooves in the ceramic burner tube 5 running parallel to its axis or corresponding ribs on the end portion of the air supply tube 6. Another possibility is to provide passages directed radially outward of small cross-section in the burner tube and/or in the portion of the air-supply tube 6 surrounding the burber tube in the region of the ring gap 26 for the cooling air from the combustion-supporting air supply. The combustion-supporting air issuing out of the annular nozzle 15 in the form of an annular air jet spurts downward along the interior of the burner tube 5, so that the burner tube 5 is also cooled on its inner side.

In cases of very high air preheating, it is necessary also to take special precautions for the annular nozzle 15 itself in the region of the burner port 14. For this purpose, as shown in FIG. 3, the annular nozzle 15 may be bounded on the interior side by a ceramic tube 28 that is connected to the portion of correspondingly reduced diameter of the air-guiding cylinder 11. Such a ceramic tube 28 can, of course, be utilized in the embodiments of FIGS. 1 and 2.

Since the combustion air supply in both illustrated embodiments is delivered by the annular nozzle 15 along the interior wall surface of the burner tube 5, the space located internally of the air guiding cylinder 11 is essentially free, even in the region of the burner port 14. For this reason, in this space between the annular nozzle 15 and the fuel supply tube 17, ignition and flame monitoring devices can be mounted, as indicated at 29 in FIG. 1. Furthermore, within the air-guiding cylinder 11, cooling air can be blown without hindrance into the oven chamber 1, which on its entire path through the burner 4 bypasses the recuperator 7, so that undesired preheating of the cooling air is avoided. The cool air supply pipe is indicated at 30.

Finally, deflection vanes 31 (FIG. 2) can be set into the annular jet 15 to provide a vortex effect for stabilizing the jet.

Although the invention has been described with reference to particular illustrative embodiments, it will be understood that other variations and modifications can be made within the inventive concept.

I claim:

1. A burner system for heating oven spaces of industrial ovens of the kind using a ceramic burner tube at the downstream end of the burner system and an air supply tube coaxial with the burner tube connecting therewith to provide a burner port in the region of the connection, where air and fuel are mixed for ignition, a fuel supply tube of smaller diameter leading to the burner port region being centered within the air supply tube, the air supply tube being surrounded by a passage through which combustion product gases pass out in countercurrent to the air supply and being equipped with means constituting a recuperator for preheating of the air supply by heat removed from the combustion product gases, said air supply tube further having an air-guiding cylinder within it for confining the air supply flow to an annular space for effective operation of said recuperator, said burner system further comprising the improvement which consists in that:

an annular nozzle (15) adjacent to the interior wall of said burner tube (5) is connected to said air supply tube (6) at its extremity, for causing air from said annular space (12) of said air supply tube to flow out at increased velocity in an annular jet along the interior wall of said burner tube (5), and means are provided for cooling said air supply tube (6) in the region of its extremity at said burner port (14) by gas, of a temperature lower than that of the flame gases, penetrating between said air supply tube (6) and said burner tube (5).

2. A burner system as defined in claim 1, in which said burner tube (5) is of a configuration consistent with the formation of an underpressure zone (22) between said air jet issuing from said annular nozzle (15) and the interior wall of said burner tube (5), said underpressure zone being connected by passages to a space (3) containing combustion product gases on the exterior side of said burner tube (5).

3. A burner system as defined in claim 2, in which said underpressure zone (22) is connected with said space (3) containing combustion product gases through annularly disposed passage means (23) between the interior wall surface of said burner tube (5) and a portion of said air supply tube (6) extending into and overlapping said burner tube (5).

4. A burner system as defined in claim 3, in which said passage means are provided by clearances existing when said burner tube (5) is mounted by being put in place on the end of said air supply tube (6) in a non-tight manner.

5. A burner system as defined in claim 1, in which air supply means are connected to said air supply tube in a manner maintaining the pressure in said annular space (12) of said air supply tube that is greater than the pressure existing in the space (3) surrounding said burner tube (5), and in which said means for cooling said air supply tube (6) in the region of its extremity at said burner port (14) includes an annular gap (26) between said burner tube (5) and said air supply tube (6) which connects said annular space (12) of said air supply tube with said space (3) surrounding the exterior of said burner tube (5).

6. A burner system as defined in claim 5, in which said burner tube (5) is inserted in the extremity of said air supply tube (6) in a non-tight manner to provide in the region of overlap between the respective extremities of said burner tube and said air supply tube the said annular gap (26), whereby both said burner tube and said air supply tube are cooled by the leakage of air through said annular gap (26) to the exterior of said burner tube.

7. A burner system as defined in any one of claims 1–6, in which said air supply tube is connected to air supply means capable of producing an air jet velocity issuing from said annular nozzle (15) of at least 50 meters per second at the nominal full load of said burner system and an air pre-heat temperature of at least 500° C.

8. A burner system as defined in any one of claims 1–6, in which said recuperator (7) is designed for combustion air preheating to at least 50% of the oven gas temperature produced by said burner system.

9. A burner system as defined in any one of claims 1–6, in which said annular nozzle (15) is provided with a ceramic tube (28) defining the inner boundary of its nozzle passage and forming the inner extremity of the nozzle.

10. A burner system as defined in any one of claims 1–6, in which a cool air supply duct is provided within said air supply tube (6), which duct is externally bounded by said air guiding cylinder (11) and said annaular nozzle (15) and is connected to a cool air supply (30).

11. A burner system as defined in any one of claims 1–6, in which ignition and flame monitoring devices (29) are positioned between said annular nozzle (15) and said fuel supply tube (17).

12. A burner system as defined in any one of claims 1–6, in which annular nozzle (15) is equipped with means for imparting vortex flow to combustion-supporting air passing through said nozzle.

* * * * *